US011895514B2

(12) United States Patent
Pradas et al.

(10) Patent No.: US 11,895,514 B2
(45) Date of Patent: Feb. 6, 2024

(54) METHOD AND APPARATUS USED IN TRANSMISSION RELIABILITY

(71) Applicant: TELEFONAKTIEBOLAGET LM ERICSSON (PUBL), Stockholm (SE)

(72) Inventors: Jose Luis Pradas, Stockholm (SE); Nianshan Shi, Järfälla (SE); Torsten Dudda, Wassenberg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 236 days.

(21) Appl. No.: 17/284,292

(22) PCT Filed: Oct. 10, 2019

(86) PCT No.: PCT/IB2019/058665
§ 371 (c)(1),
(2) Date: Apr. 9, 2021

(87) PCT Pub. No.: WO2020/075118
PCT Pub. Date: Apr. 16, 2020

(65) Prior Publication Data
US 2021/0345139 A1 Nov. 4, 2021

Related U.S. Application Data

(60) Provisional application No. 62/743,942, filed on Oct. 10, 2018.

(51) Int. Cl.
*H04W 76/15* (2018.01)
*H04W 24/04* (2009.01)
(Continued)

(52) U.S. Cl.
CPC ........... *H04W 24/04* (2013.01); *H04W 76/15* (2018.02); *H04W 76/18* (2018.02); *H04W 80/02* (2013.01); *H04W 88/06* (2013.01)

(58) Field of Classification Search
CPC ..... H04W 24/04; H04W 76/15; H04W 76/18; H04W 80/02; H04W 88/06;
(Continued)

(56) References Cited

U.S. PATENT DOCUMENTS

2016/0066222 A1    3/2016  Makinen et al.
2017/0171903 A1*   6/2017  Kubota ............... H04W 36/165

FOREIGN PATENT DOCUMENTS

CN    105191402 A    12/2015
CN    107078968 A     8/2017
(Continued)

OTHER PUBLICATIONS

Office Action dated Oct. 30, 2023 for Chinese Patent Application No. 201980081964.4, 8 pages.

*Primary Examiner* — Huy C Ho
(74) *Attorney, Agent, or Firm* — Sage Patent Group

(57) ABSTRACT

A method for transmission reliability comprises receiving, from a first network node at a second network node, a message indicating that a first connection between the first network node and a terminal device has failed. The message comprises an indication to initiate a second connection with the terminal device from the second network node. The method further comprises establishing, at the second network node, the second connection with the terminal device based on the message. The second network node comprises a third connection established before the first connection failed. The first connection carries data transmitted in the third connection before the first connection failed, and the second connection carries data transmitted in the third connection after the first connection failed. The method for interference coordination utilizes duplicated transmissions to secure data transmission and to prevent data loss in an unexpected system failure.

20 Claims, 15 Drawing Sheets

(51) Int. Cl.
*H04W 76/18* (2018.01)
*H04W 80/02* (2009.01)
*H04W 88/06* (2009.01)

(58) Field of Classification Search
CPC ........... H04W 36/0069; H04W 36/305; H04W 40/24; H04L 45/28; H04L 45/22
USPC ........................................................ 455/423
See application file for complete search history.

(56) References Cited

FOREIGN PATENT DOCUMENTS

WO      2014111499 A1    7/2014
WO      2018027987 A1    2/2018

* cited by examiner

METHOD AND APPARATUS USED IN TRANSMISSION RELIABILITY

This application is a 371 of International Application No. PCT/IB2019/058665, filed Oct. 10, 2019, which claims the benefit of U.S. Provisional Application No. 62/743,942, filed Oct. 10, 2018, the disclosures of which are fully incorporated herein by reference.

TECHNICAL FIELD

Particular embodiments relate to the field of transmission reliability; and more specifically, to methods and apparatuses utilizing multiple connections to improve transmission reliability.

BACKGROUND

For communication systems, 3GPP has approved a Release 16 standards which studies Item NR IIoT aiming for low latency and high reliability, as well as high availability, URLLC. The high reliability is expected to be a basic requirement in much wider range of services. For example, the low latency and high reliability are very important factors, for example, in industry, automation use cases, and several special subtasks of Smart Grid service, especially for factory and the use cases which require high speed motion control, packaging, printing, and like. In the above use cases, the guarantees on latency and reliability requirements together provide a sufficient service quality. High reliability is also important in such use cases which have relatively relaxed requirements on latency, e.g., higher delay and/or higher jitter can be tolerated. For example, Intelligent Traffic Systems (ITS), remote controlling with or without haptic feedback, robotized manufacturing, Smart Grid, Automated Guided Vehicles (AGVs), Drone Controlling, and tele-surgery, etc. In these cases, the extreme low latency is not the crucial factor, but the high, and in some cases, the extreme high, reliability of the connectivity between the application server and the critical Machine Type Communication (C-MTC) device is the most important requirement. To sum up, the reliability in connection is an important requirement in the use cases with low latency requirement, and the reliability in itself is also the basic characteristic of C-MTC services.

FIG. 1 illustrates a block diagram of an example communication system architecture with a terminal device equipped with multiple UEs. FIG. 1 illustrates an example terminal device equipped with multiple physical UEs to improve reliability. Said terminal device is then possible to set up disjoint paths with disjoint Protocol Data Unit (PDU) sessions from these UEs. Via this setup, it allows the system to select different radio access network (RAN) entities for the UEs based on a static grouping. For example, the terminal device is equipped with UE1 and UE2, and the network provides coverage with RAN entities gNB1 and gNB2 that are preferably selected such that UE1 connects to gNB1, and UE2 connects to gNB2.

In FIG. 1, the reliability is achieved by equipping the device (e.g. C-MTC device) with two UEs. However, when one of the network nodes fails and the connection between the UE and the RAN node cannot be used any more, the reliability is compromised.

There currently exist certain challenges. The existing challenges are problems and failures may occur in the connection between a RAN node and the UE. These may include the gNB1-CU receiving outage information from lower layer that the uplink (UL)/downlink (DL) of the dedicated radio bearer (DRB) is unavailable via the outage information in Downlink Data Delivery Status in the user plane (UP); UE measurements indicating that the connection is getting bad; an indication indicating that guaranteed bit rate (GBR) QoS requirement cannot be fulfilled; and the connection not providing the required reliability anymore. In the above scenarios where high reliability is required, these problems are particularly troublesome, and solutions are needed.

SUMMARY

To address the foregoing problems with existing solutions, disclosed are a method and a network node, to ensure a data transmission between a terminal device and a network node by having a duplicated connection transmitting the same data, so that a data loss can be prevented during a system failure. The present disclosure implements a solution to solve failures and problems occurred in the connection by allowing the network node to have a duplicated connection with the terminal device or to setup a dual connectivity towards to another network node. Therefore, a data transmission can be secured in the system which improves the preference of the network.

Several embodiments are elaborated in this disclosure. According to one embodiment of a method for transmission reliability, the method comprises receiving, from a first network node at a second network node, a message indicating that a first connection between the first network node and a terminal device has failed. The message comprises an indication to initiate a second connection with the terminal device from the second network node. The method further comprises establishing, at the second network node, the second connection with the terminal device based on the message. The second network node comprises a third connection established before the first connection failed. Furthermore, the first connection carries data transmitted in the third connection before the first connection failed, and the second connection carries data transmitted in the third connection after the first connection failed.

In one embodiment, at least two of the first connection, the second connection, and the third connection are provided via dual connectivity (DC).

In one embodiment, the first network node is a secondary node, and the second network node is a master node. In a particular embodiment, the second network node performs carrier aggregation (CA) for packet data convergence protocol (PDCP) duplication.

In one embodiment, the method further comprises establishing a fourth connection between the second network node and a third network node.

In one embodiment, the first network node is a master node, and the second network node is a secondary node. In a particular embodiment, the message further indicates the second network node to take over radio resource control (RRC).

In one embodiment, the terminal device is configured to a CA configuration through a master cell group (MCG) when the failure of the first connection is a secondary cell group (SCG) failure.

In one embodiment, the terminal device comprises a first UE and a second UE. In a particular embodiment, the first connection is between the first UE of the terminal device and the first network node, and the second connection and the third connection are between the second UE of the terminal device and the second network node.

According to an embodiment of a network node for transmission reliability, the network node comprises at least one processing circuitry, and at least one storage that stores processor-executable instructions, when executed by the processing circuitry, causes a network node to receive, from a first network node, a message indicating that a first connection between the first network node and a terminal device has failed. The message comprises an indication to initiate a second connection with the terminal device. The network node is further configured to establish the second connection with the terminal device based on the message. The network node comprises a third connection established before the first connection failed. Furthermore, the first connection carries data transmitted in the third connection before the first connection failed, and the second connection carries data transmitted in the third connection after the first connection failed.

Certain aspects of the present disclosure and their embodiments may provide solutions to these or other challenges. There are, proposed herein, various embodiments which address one or more of the issues disclosed herein.

Certain embodiments may provide one or more of the following technical advantages. The methods disclosed in the present disclosure may provide an efficient and secure solution for a communication system to allow a network node to establish an additional connection with a terminal device, such that when one of network nodes connecting with the terminal device is not reliable or fails to function, a data transmission can be retained and completed to further improve the performance of the network.

Various other features and advantages will become obvious to one of ordinary skill in the art in light of the following detailed description and drawings. Certain embodiments may have none, some, or all of the recited advantages.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
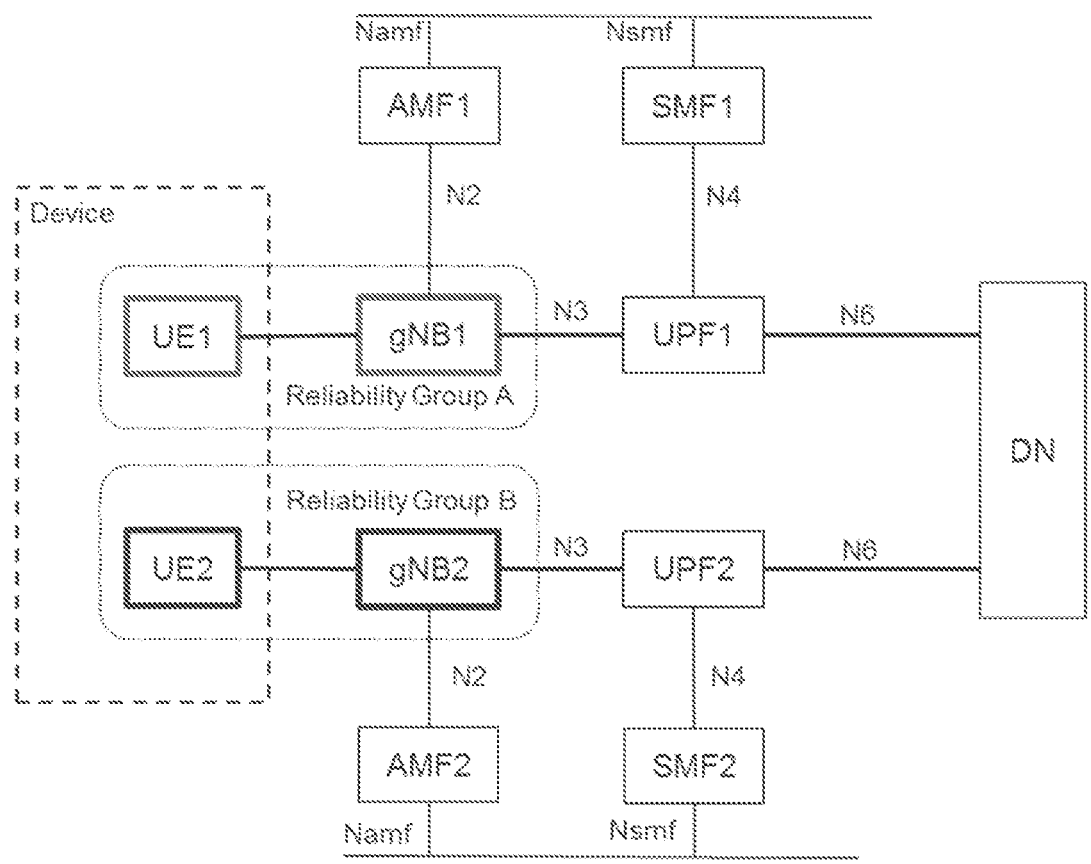
FIG. 1 illustrates a block diagram of an example communication system architecture with a terminal device equipped with multiple UEs.

Failures and data loss may occur during data transmission in communication networks, such as an unavailable resource block, a weak connection, unfulfilled QoS requirements, or a connection that cannot provide the required reliability. Therefore, the reliability of the data transmission needs improvement. Particular embodiments of the present disclosure provide a network node with a duplicated connection with a terminal device to achieve a data redundancy, such that data loss can be prevented in a system failure, especially for a terminal device equipped with multiple UEs.

Furthermore, via dual connectivity (DC), a secondary network node can further take over radio resource control (RRC) to function as a master network node upon receipt of an indication that the master network node failed. In another embodiment, the master network node may setup a redundant connection with the terminal device or with another network node upon receiving an indication that a secondary network node failed. In particular embodiments, the role of the master network node and the secondary network node can be switched between these two types of nodes. For example, taking over a connection with RRC is, in some cases, part of the role switch. In particular embodiments, a network node with RRC connection may be considered as a master network node.

Particular embodiments of the present application provide solutions that ensure the reliability when the connection between one UE and the RAN node is no longer reliable any more in the case when the device is served by multiple UEs to provide reliability. Certain embodiments of the present application also provide solutions in the case that multiple connectivity is reached within a single UE, e.g. by setup to parallel PDU sessions, or by duplicating the QoS flows for redundancy.

In the present disclosure, a network node may be referred to as a base station. The base station is a general term and can correspond to any type of radio network node or any network node, which communicates with a UE and/or with another network node. Examples of network nodes are NodeB, base station (BS), multi-standard radio (MSR) radio node, such as MSR BS, eNB, gNB. MeNB, SeNB, network controller, radio network controller (RNC), core network node (AMF, MME, MSC etc.), base station controller (BSC), road side unit (RSU), relay, donor node controlling relay, base transceiver station (BTS), access point (AP), transmission points, transmission nodes, RRU, RRH, nodes in distributed antenna system (DAS), O&M, OSS, SON, positioning node (e.g. E-SMLC) etc.

The term radio access technology, or RAT, may refer to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term reference signal used herein can be any physical signal or physical channel Examples of downlink reference signals are PSS, SSS, CRS, PRS, CSI-RS, DMRS, NRS, NPSS, NSSS, SS, MBSFN RS etc. Examples of uplink reference signals are SRS, DMRS etc.

The present disclosure presents the non-limiting example of NG-RAN and SGC, where gNB is taken as an example of BS and Access and Mobility Management Function (AMF) is an example of the MM node. This is a non-limiting example. The messages and the IE names are examples and can be implemented differently.

Figure 2:
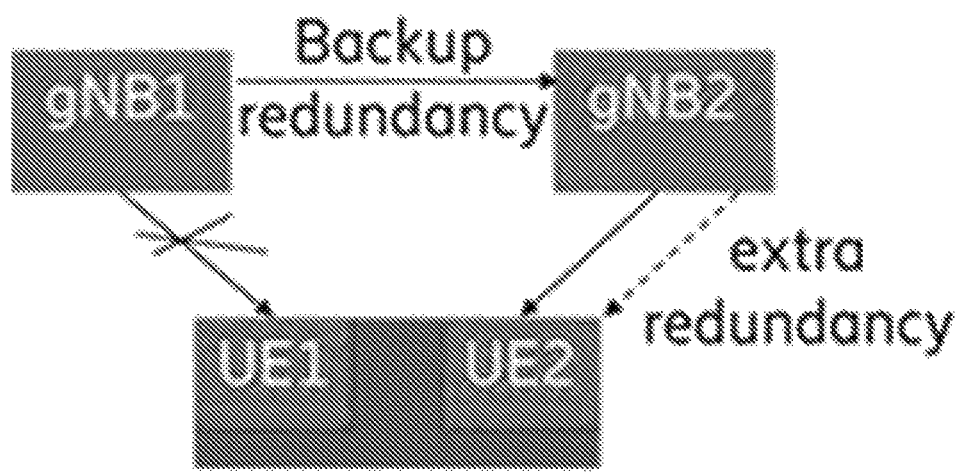
FIG. 2 illustrates a block diagram of an example network node having an extra connection with the terminal device equipped with multiple UEs, according to certain embodiments.

FIG. 2 is a block diagram of an example network node having an extra connection with the terminal device equipped with multiple UEs, in accordance with certain embodiments.

In the use case of a terminal device equipped with two UEs, a first embodiment illustrates a method to switch from multiple UEs to single UE utilizing multiple PDU sessions to improve QoS flow reliability. The reliability is achieved by equipping the terminal device with multiple UEs. When the connection between the UE1 and gNB1 is unreliable, the gNB1 will notify core network (CN) that there is a problem with the connection to the UE, alternatively lower layer. Upon the reception of such an indication from RAN node, e.g., gNB1, the CN may initiate a second PDU session, which carries the same data as in the exiting PDU session, towards UE2. Therefore, two parallel PDU sessions are sent up towards UE2 to achieve the reliability.

In particular embodiments, an indication may be implemented in UE CONTEXT RELEASE REQUEST sent from RAN node to CN, and/or in another message. In particular embodiments, UE1 may also need to provide an identifier to UE2, if it needs to indicate which UE is equipped in the same device and if 5G core network does not have the information. In particular embodiments, upon reception of the indication, the CN may trigger the QoS flows in the PDU session which are redundant and are sent via two NG-UP tunnels to achieve reliability in UE2. In particular embodiments, the CN may trigger other solutions/configurations for a single UE to achieve the reliability. In particular embodiments, the CN may set up a redundancy path towards the second UE if one of the UE is released, when the device is equipped with two UEs for the C-MTC case.

FIG. 2 also illustrates a second embodiment to notify the new gNB to setup the redundant path. A "backup redundancy" indication is sent from the gNB (gNB1) experiencing problems to another gNB (gNB2), to indicate that the reliability between gNB1 and UE1 has a problem and a backup redundancy is needed in gNB2. Upon the reception of such indication, gNB2 may establish a new path towards UE2 to provide extra reliability. In particular embodiments, the second embodiment may include creating carrier aggregation (CA), dual connectivity (DC), or CA and DC in UE2 to make use of the RAN level duplication.

FIG. 2 also illustrates a third embodiment to force new gNB to take over the UE. A "backup redundancy" indication is sent from gNB1 to gNB2, to force that the new gNB to take over the UE1, which it may normally refuse due to the gNBs belong to different reliability groups. For example, the reliability groups may be defined, so that a reliability group A node would only serve a reliability group A UEs. If the reliability group A node hands over its UE to a reliability group B node, the reliability group B will reject the handover to make sure the redundancy achieved by multiple UEs are resource isolated. However, if the backup redundancy is indicated in the handover request, it will force the gNB2 to take over the UE1 despite which the reliability group belongs to, but the gNB2 will use different radio resources than used for UE2. For example, in particular embodiments, if gNB1 and gNB2 are the same reliability group, when a connection provided by gNB1 failed and a handover request is sent from gNB1, gNB2 does not accept the handover request. In another embodiment, if a backup redundancy and/or an urgency request is indicated in the handover request, gNB2 would take over the UE1 upon receipt of the handover request.

A fourth embodiment illustrates a method to handle radio link failure (RLF) to ensure reliability. When the UE1 is dropped from gNB1, it may perform RLF to gNB2. The fourth embodiment is to ensure that the gNB2 handles the UE1 accordingly. In one embodiment, gNB2 handles the RLF from UE1 as usual and retrieves the UE context from gNB1. The gNB1 may in the UE context of the UE1 marked that a back redundancy handling is needed. Despite the reliability group information, the gNB2 would take over UE 1. In another embodiment, when gNB1 lost the UE1 with high reliability requirements, it may indicate this information to its neighboring gNBs that UE1, which for example identified by CRNTI, is in need of the backup redundancy handling. The gNB (e.g., gNB2) which receives RLF from the UE1 will be able to handle the UE.

In particular embodiments, the RAN node may configure the UE with a RRC message to perform certain signal quality measurements. When the quality is below a configured threshold, the UE would send a report, and the RAN node may then perform a reconfiguration in the network side or may reconfigure the UE1 to allow access to the gNB2. Alternatively, when the quality is below a configured threshold, the UE would apply a configuration which was previously given to the UE via RRC.

Figure 3A:
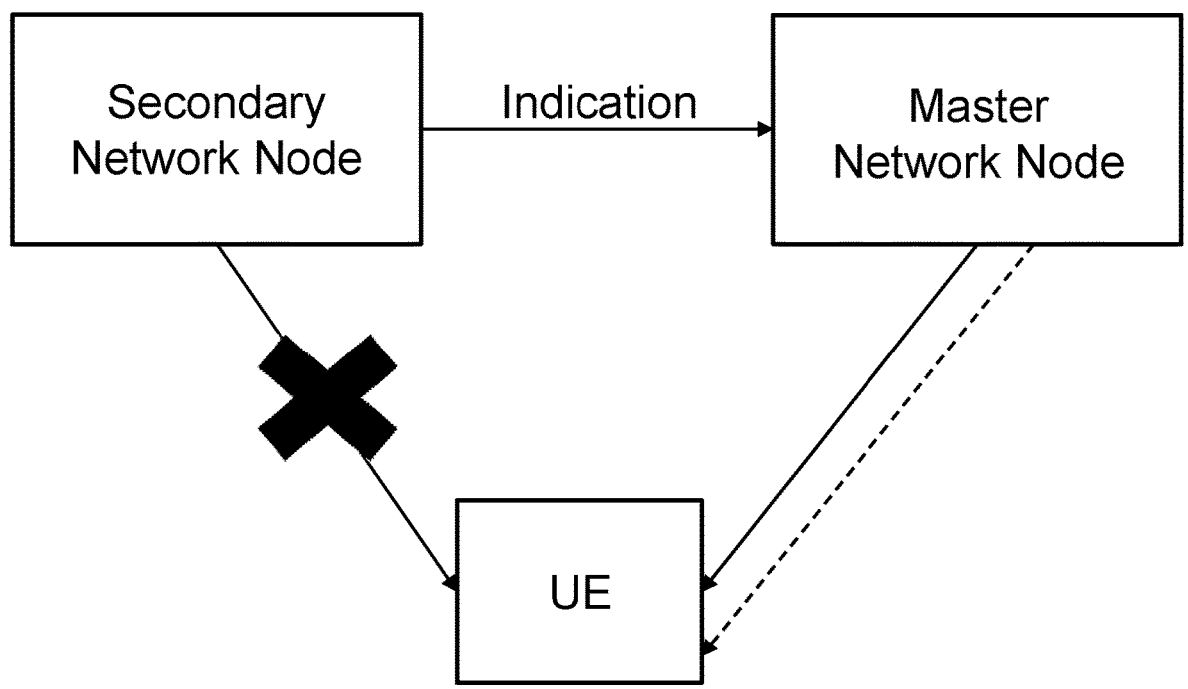
FIGS. 3A-3B illustrate block diagrams of an example network node having an extra connection with a UE via dual connectivity, according to certain embodiments.
Figure 3B:
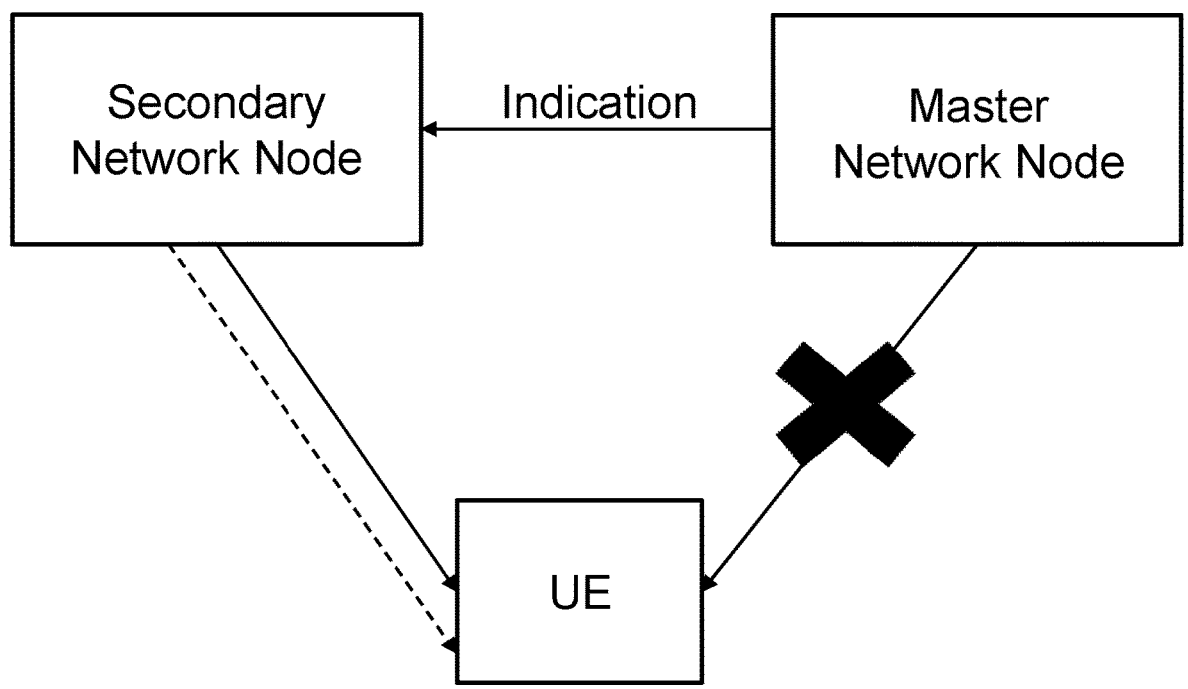

FIGS. 3A-3B are block diagrams of an example network node having an extra connection with a UE via dual connectivity, in accordance with certain embodiments. In FIGS. 3A and 3B, a single UE with multiple connectivity connects with a master network node and a secondary network node. In particular embodiment, two PDU sessions are setup in DC, and QoS flow is redundant in DC.

When DC is used to provide redundancy, if one of the connections between one gNB and the UE fails, the gNB may indicate this information to the other network node that a backup redundancy is required. In FIG. 3A, when the failing node is secondary network node (SN), upon the reception of such indication, the master network node (MN) may setup a redundancy path, e.g., perform CA for packet data convergence protocol (PDCP) duplication, or try to setup the DC towards another node.

In FIG. 3B, when the failing node is MN, it may inform SN to take over the RRC and act as a MN, such that the MN role is transferred to the currently working SN. Alternatively, when the duplication is provided via DC and when there is a secondary cell group (SCG) failure, in order to continue providing reliability by means of duplication, the network and the UE may switch to a pre-defined back-up configuration, e.g., a CA configuration through the master cell group (MCG). At least temporarily, while the DC recovers, the reliability can be sustained by means of CA by MCG.

Figure 4:
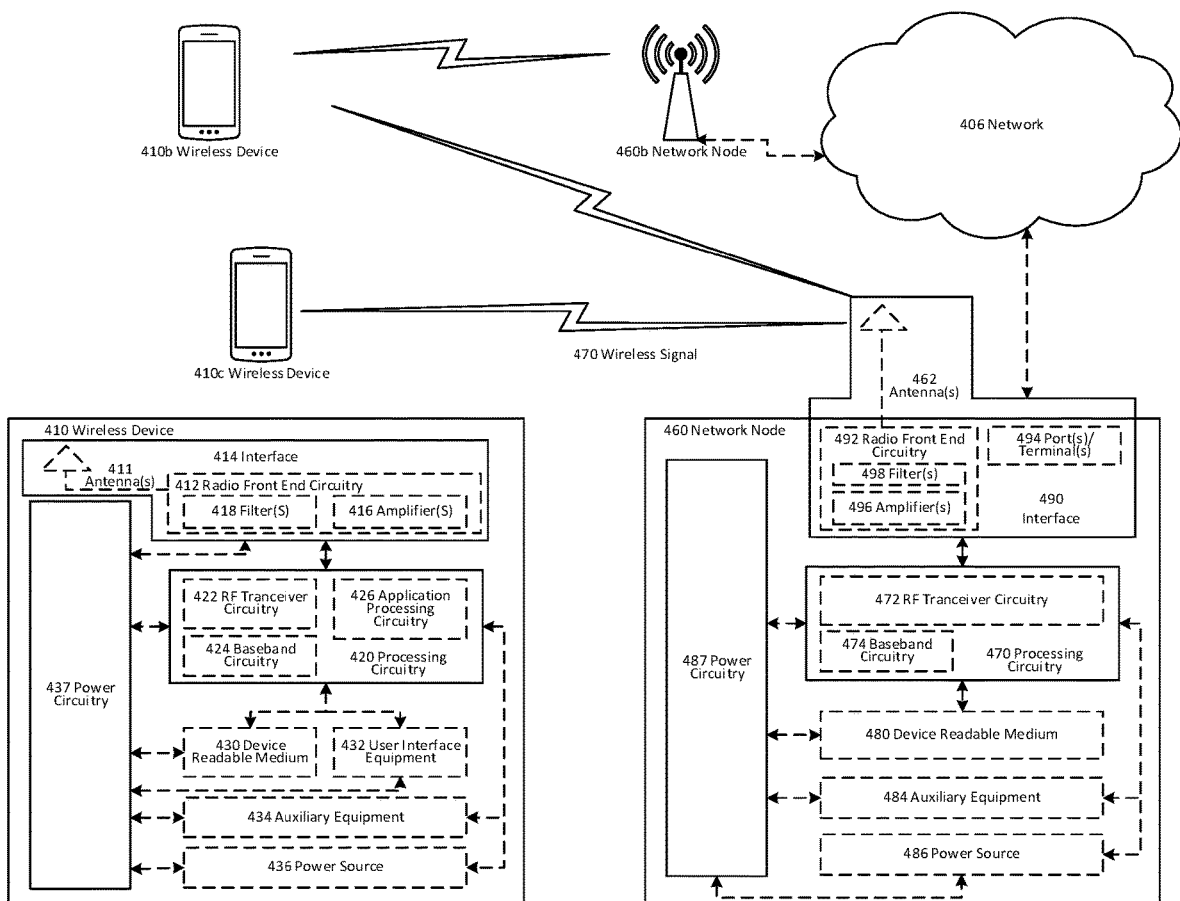
FIG. 4 illustrates an example wireless network, according to certain embodiments.

FIG. 4 is an example wireless network, in accordance with certain embodiments. Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 406, network nodes 460 and 460*b*, and wireless devices (WDs) 410, 410*b*, and 410*c*. In practice, a wireless network may further include any additional elements suitable to support communication between wireless devices or between a wireless device and another communication device, such as a landline telephone, a service provider, or any other network node or end device. Of the illustrated components, network node 460 and wireless device (WD) 410 are depicted with additional detail. In some embodiments, the network node 460 may be a base station, such as an eNB. In the present disclosure, the term eNB may be used to refer to both an eNB and a ng-eNB unless there is a specific need to distinguish between the two. In certain embodiments, the network node 460 may be a network node, which is further illustrated in FIG. 14. In certain embodiments, the network node 460 may be the gNB described in FIG. 2. In certain embodiments, the network node 460 may be the master node described in FIGS. 3A-3B. In certain embodiments, the network node 460 may be the secondary node described in FIGS. 3A-3B. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 460 and WD 410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 460 includes processing circuitry 470, device readable medium 480, interface 490, auxiliary equipment 488, power source 486, power circuitry 487, and antenna 462. Although network node 460 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple RAM modules).

Similarly, network node 460 may be composed of multiple physically separate components (e.g., a NodeB component and a RNC component, or a BTS component and a BSC component, etc.), which may each have their own respective components. In certain scenarios in which network node 460 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 460 may be configured to support multiple radio access technologies (RATs). In such embodiments, some components may be duplicated (e.g., separate device readable medium 480 for the different RATs) and some components may be reused (e.g., the same antenna 462 may be shared by the RATs). Network node 460 may also include multiple sets of the various illustrated components for different wireless technologies integrated into network node 460, such as, for example, GSM, WCDMA, LTE, NR, WiFi, or Bluetooth wireless technologies. These wireless technologies may be integrated into the same or different chip or set of chips and other components within network node 460.

Processing circuitry 470 is configured to perform any determining, calculating, or similar operations (e.g., certain obtaining operations) described herein as being provided by a network node. These operations performed by processing circuitry 470 may include processing information obtained by processing circuitry 470 by, for example, converting the obtained information into other information, comparing the obtained information or converted information to information stored in the network node, and/or performing one or more operations based on the obtained information or converted information, and as a result of said processing making a determination.

Processing circuitry 470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 460 components, such as device readable medium 480, network node 460 functionality. For example, processing circuitry 470 may execute instructions stored in device readable medium 480 or in memory within processing circuitry 470. Such functionality may include providing any of the various wireless features, functions, or benefits discussed herein. In some embodiments, processing circuitry 470 may include a system on a chip (SOC).

In some embodiments, processing circuitry 470 may include one or more of radio frequency (RF) transceiver circuitry 472 and baseband processing circuitry 474. In some embodiments, radio frequency (RF) transceiver circuitry 472 and baseband processing circuitry 474 may be on separate chips (or sets of chips), boards, or units, such as radio units and digital units. In alternative embodiments, part or all of RF transceiver circuitry 472 and baseband processing circuitry 474 may be on the same chip or set of chips, boards, or units In certain embodiments, some or all of the functionality described herein as being provided by a network node, base station, eNB or other such network device may be performed by processing circuitry 470 executing instructions stored on device readable medium 480 or memory within processing circuitry 470. In alternative embodiments, some or all of the functionality may be provided by processing circuitry 470 without executing instructions stored on a separate or discrete device readable medium, such as in a hard-wired manner. In any of those embodiments, whether executing instructions stored on a device readable storage medium or not, processing circuitry 470 can be configured to perform the described functionality. In particular embodiments, the processing circuitry 470 of the network node 460 may perform a method which is further illustrated in FIG. 13. The benefits provided by such functionality are not limited to processing circuitry 470 alone or to other components of network node 460 but are enjoyed by network node 460 as a whole, and/or by end users and the wireless network generally.

Device readable medium 480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 470. Device readable medium 480 may store any suitable instructions, data or information, including a computer program, software, an application including one or more of logic, rules, code, tables, etc. and/or other instructions capable of being executed by processing circuitry 470 and, utilized by network node 460. Device readable medium 480 may be used to store any calculations made by processing circuitry 470 and/or any data received via interface 490. In some embodiments, processing circuitry 470 and device readable medium 480 may be considered to be integrated.

Interface 490 is used in the wired or wireless communication of signaling and/or data between network node 460, network 406, and/or WDs 410. As illustrated, interface 490 comprises port(s)/terminal(s) 494 to send and receive data, for example to and from network 406 over a wired connection. Interface 490 also includes radio front end circuitry 492 that may be coupled to, or in certain embodiments a part of, antenna 462. Radio front end circuitry 492 comprises filters 498 and amplifiers 496. Radio front end circuitry 492 may be connected to antenna 462 and processing circuitry 470. Radio front end circuitry may be configured to condition signals communicated between antenna 462 and processing circuitry 470. Radio front end circuitry 492 may receive digital data that is to be sent out to other network nodes or WDs via a wireless connection. Radio front end circuitry 492 may convert the digital data into a radio signal having the appropriate channel and bandwidth parameters using a combination of filters 498 and/or amplifiers 496. The radio signal may then be transmitted via antenna 462. Similarly, when receiving data, antenna 462 may collect radio signals which are then converted into digital data by radio front end circuitry 492. The digital data may be passed to processing circuitry 470. In other embodiments, the interface may comprise different components and/or different combinations of components.

In certain alternative embodiments, network node 460 may not include separate radio front end circuitry 492, instead, processing circuitry 470 may comprise radio front end circuitry and may be connected to antenna 462 without separate radio front end circuitry 492. Similarly, in some embodiments, all or some of RF transceiver circuitry 472 may be considered a part of interface 490. In still other embodiments, interface 490 may include one or more ports or terminals 494, radio front end circuitry 492, and RF transceiver circuitry 472, as part of a radio unit (not shown), and interface 490 may communicate with baseband processing circuitry 474, which is part of a digital unit (not shown).

Antenna 462 may include one or more antennas, or antenna arrays, configured to send and/or receive wireless signals. Antenna 462 may be coupled to radio front end circuitry 490 and may be any type of antenna capable of transmitting and receiving data and/or signals wirelessly. In some embodiments, antenna 462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 462 may be separate from network node 460 and may be connectable to network node 460 through an interface or port.

Antenna 462, interface 490, and/or processing circuitry 470 may be configured to perform any receiving operations and/or certain obtaining operations described herein as being performed by a network node. Any information, data and/or signals may be received from a wireless device, another network node and/or any other network equipment. Similarly, antenna 462, interface 490, and/or processing circuitry 470 may be configured to perform any transmitting operations described herein as being performed by a network node. Any information, data and/or signals may be transmitted to a wireless device, another network node and/or any other network equipment.

Power circuitry 487 may comprise, or be coupled to, power management circuitry and is configured to supply the components of network node 460 with power for performing the functionality described herein. Power circuitry 487 may receive power from power source 486. Power source 486 and/or power circuitry 487 may be configured to provide power to the various components of network node 460 in a form suitable for the respective components (e.g., at a voltage and current level needed for each respective component). Power source 486 may either be included in, or external to, power circuitry 487 and/or network node 460. For example, network node 460 may be connectable to an external power source (e.g., an electricity outlet) via an input circuitry or interface such as an electrical cable, whereby the external power source supplies power to power circuitry 487. As a further example, power source 486 may comprise a source of power in the form of a battery or battery pack which is connected to, or integrated in, power circuitry 487. The battery may provide backup power should the external power source fail. Other types of power sources, such as photovoltaic devices, may also be used.

Alternative embodiments of network node 460 may include additional components beyond those shown in FIG. 4 that may be responsible for providing certain aspects of the network node's functionality, including any of the functionality described herein and/or any functionality necessary to support the subject matter described herein. For example, network node 460 may include user interface equipment to allow input of information into network node 460 and to allow output of information from network node 460. This may allow a user to perform diagnostic, maintenance, repair, and other administrative functions for network node 460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 410 includes antenna 411, interface 414, processing circuitry 420, device readable medium 430, user interface equipment 432, auxiliary equipment 434, power source 436 and power circuitry 437. WD 410 may include multiple sets of one or more of the illustrated components for different wireless technologies supported by WD 410, such as, for example, GSM, WCDMA, LTE, NR, WiFi, WiMAX, or Bluetooth wireless technologies, just to mention a few. These wireless technologies may be integrated into the same or different chips or set of chips as other components within WD 410.

Antenna 411 may include one or more antennas or antenna arrays, configured to send and/or receive wireless signals, and is connected to interface 414. In certain alternative embodiments, antenna 411 may be separate from WD 410 and be connectable to WD 410 through an interface or port. Antenna 411, interface 414, and/or processing circuitry 420 may be configured to perform any receiving or transmitting operations described herein as being performed by a WD. Any information, data and/or signals may be received from a network node and/or another WD. In some embodiments, radio front end circuitry and/or antenna 411 may be considered an interface.

As illustrated, interface 414 comprises radio front end circuitry 412 and antenna 411. Radio front end circuitry 412 comprise one or more filters 418 and amplifiers 416. Radio front end circuitry 414 is connected to antenna 411 and processing circuitry 420 and is configured to condition signals communicated between antenna 411 and processing circuitry 420. Radio front end circuitry 412 may be coupled to or a part of antenna 411. In some embodiments, WD 410 may not include separate radio front end circuitry 412; rather, processing circuitry 420 may comprise radio front end circuitry and may be connected to antenna 411. Similarly, in some embodiments, some or all of RF transceiver circuitry 422 may be considered a part of interface 414. Radio front end circuitry 412 may receive digital data that is to be sent out to other network nodes or WDs via a wireless connection. Radio front end circuitry 412 may convert the digital data into a radio signal having the appropriate channel and bandwidth parameters using a combination of filters 418 and/or amplifiers 416. The radio signal may then be transmitted via antenna 411. Similarly, when receiving data, antenna 411 may collect radio signals which are then converted into digital data by radio front end circuitry 412. The digital data may be passed to processing circuitry 420. In other embodiments, the interface may comprise different components and/or different combinations of components.

Processing circuitry 420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 410 components, such as device readable medium 430, WD 410 functionality. Such functionality may include providing any of the various wireless features or benefits discussed herein. For example, processing circuitry 420 may execute instructions stored in device readable medium 430 or in memory within processing circuitry 420 to provide the functionality disclosed herein. In particular embodiments, the processing circuitry 420 of the WD 410 may execute instructions to perform measurements for certain cells in the network 406, which is further illustrated below.

As illustrated, processing circuitry 420 includes one or more of RF transceiver circuitry 422, baseband processing circuitry 424, and application processing circuitry 426. In other embodiments, the processing circuitry may comprise different components and/or different combinations of components. In certain embodiments processing circuitry 420 of WD 410 may comprise a SOC. In some embodiments, RF transceiver circuitry 422, baseband processing circuitry 424, and application processing circuitry 426 may be on separate chips or sets of chips. In alternative embodiments, part or all of baseband processing circuitry 424 and application processing circuitry 426 may be combined into one chip or set of chips, and RF transceiver circuitry 422 may be on a separate chip or set of chips. In still alternative embodiments, part or all of RF transceiver circuitry 422 and baseband processing circuitry 424 may be on the same chip or set of chips, and application processing circuitry 426 may be on a separate chip or set of chips. In yet other alternative embodiments, part or all of RF transceiver circuitry 422, baseband processing circuitry 424, and application processing circuitry 426 may be combined in the same chip or set of chips. In some embodiments, RF transceiver circuitry 422 may be a part of interface 414. RF transceiver circuitry 422 may condition RF signals for processing circuitry 420.

In certain embodiments, some or all of the functionalities described herein as being performed by a WD may be provided by processing circuitry 420 executing instructions stored on device readable medium 430, which in certain embodiments may be a computer-readable storage medium. In alternative embodiments, some or all of the functionality may be provided by processing circuitry 420 without executing instructions stored on a separate or discrete device readable storage medium, such as in a hard-wired manner. In any of those particular embodiments, whether executing instructions stored on a device readable storage medium or not, processing circuitry 420 can be configured to perform the described functionality. The benefits provided by such functionality are not limited to processing circuitry 420 alone or to other components of WD 410, but are enjoyed by WD 410 as a whole, and/or by end users and the wireless network generally.

Processing circuitry 420 may be configured to perform any determining, calculating, or similar operations (e.g., certain obtaining operations) described herein as being performed by a WD. These operations, as performed by processing circuitry 420, may include processing information obtained by processing circuitry 420 by, for example, converting the obtained information into other information, comparing the obtained information or converted information to information stored by WD 410, and/or performing one or more operations based on the obtained information or converted information, and as a result of said processing making a determination.

Device readable medium 430 may be operable to store a computer program, software, an application including one or more of logic, rules, code, tables, etc. and/or other instructions capable of being executed by processing circuitry 420. Device readable medium 430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 420. In some embodiments, processing circuitry 420 and device readable medium 430 may be considered to be integrated.

User interface equipment 432 may provide components that allow for a human user to interact with WD 410. Such interaction may be of many forms, such as visual, audial, tactile, etc. User interface equipment 432 may be operable to produce output to the user and to allow the user to provide input to WD 410. The type of interaction may vary depending on the type of user interface equipment 432 installed in WD 410. For example, if WD 410 is a smart phone, the interaction may be via a touch screen; if WD 410 is a smart meter, the interaction may be through a screen that provides usage (e.g., the number of gallons used) or a speaker that provides an audible alert (e.g., if smoke is detected). User interface equipment 432 may include input interfaces, devices and circuits, and output interfaces, devices and circuits. User interface equipment 432 is configured to allow input of information into WD 410 and is connected to processing circuitry 420 to allow processing circuitry 420 to process the input information. User interface equipment 432 may include, for example, a microphone, a proximity or other sensor, keys/buttons, a touch display, one or more cameras, a USB port, or other input circuitry. User interface equipment 432 is also configured to allow output of information from WD 410, and to allow processing circuitry 420 to output information from WD 410. User interface equipment 432 may include, for example, a speaker, a display, vibrating circuitry, a USB port, a headphone interface, or other output circuitry. Using one or more input and output interfaces, devices, and circuits, of user interface equipment 432, WD 410 may communicate with end users and/or the wireless network and allow them to benefit from the functionality described herein.

Auxiliary equipment 434 is operable to provide more specific functionality which may not be generally performed by WDs. This may comprise specialized sensors for doing measurements for various purposes, interfaces for additional types of communication such as wired communications etc. The inclusion and type of components of auxiliary equipment 434 may vary depending on the embodiment and/or scenario.

Power source 436 may, in some embodiments, be in the form of a battery or battery pack. Other types of power sources, such as an external power source (e.g., an electricity outlet), photovoltaic devices or power cells, may also be used. WD 410 may further comprise power circuitry 437 for delivering power from power source 436 to the various parts of WD 410 which need power from power source 436 to carry out any functionality described or indicated herein. Power circuitry 437 may in certain embodiments comprise power management circuitry. Power circuitry 437 may additionally or alternatively be operable to receive power from an external power source; in which case WD 410 may be connectable to the external power source (such as an electricity outlet) via input circuitry or an interface such as an electrical power cable. Power circuitry 437 may also in certain embodiments be operable to deliver power from an external power source to power source 436. This may be, for example, for the charging of power source 436. Power circuitry 437 may perform any formatting, converting, or other modification to the power from power source 436 to make the power suitable for the respective components of WD 410 to which power is supplied.

Figure 5:
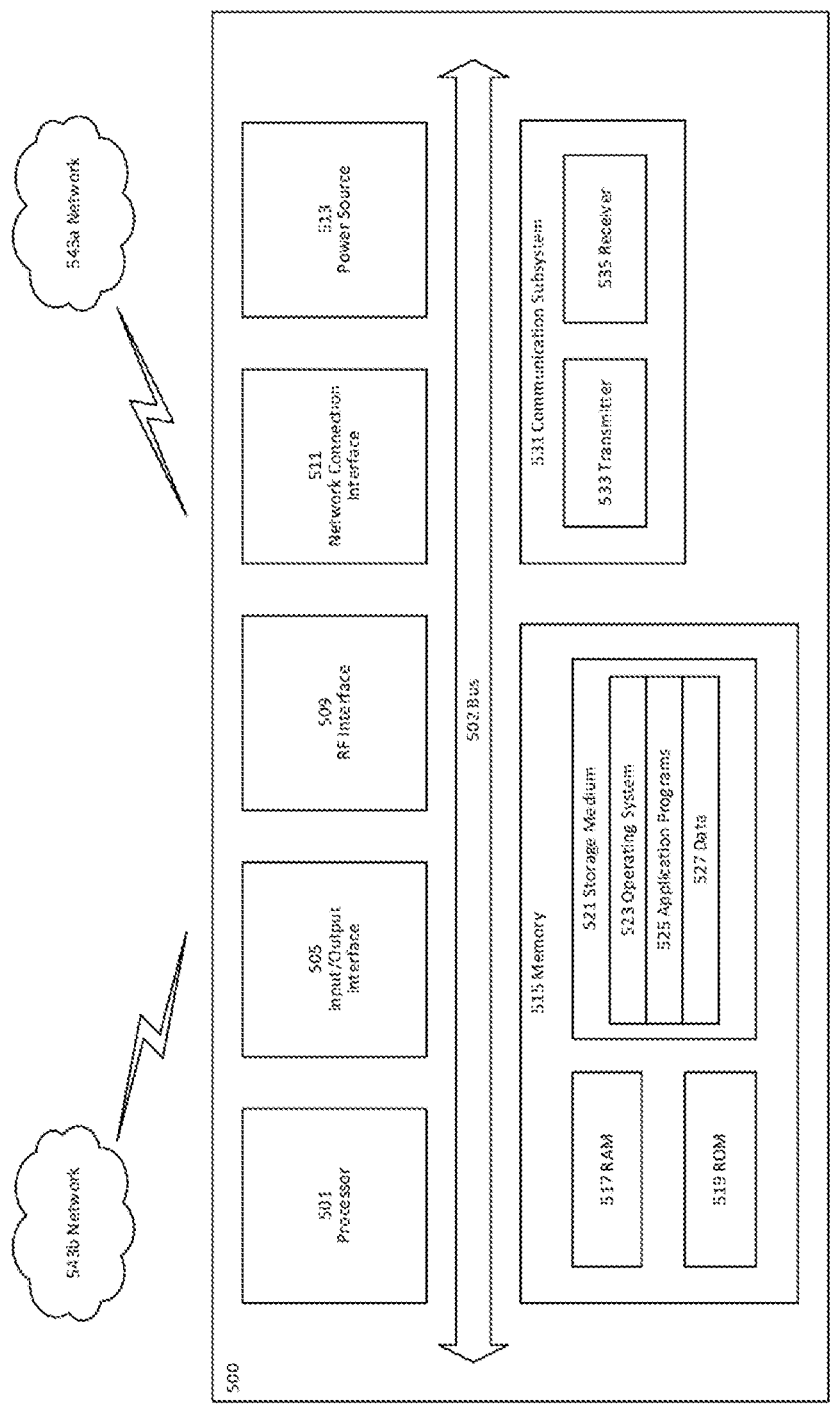
FIG. 5 illustrates an example user equipment, according to certain embodiments.

FIG. 5 illustrates one embodiment of a UE, in accordance with certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 400 may be any UE identified by the 3rd Generation Partnership Project (3GPP), including a NB-IoT UE, a MTC UE, and/or an enhanced MTC (eMTC) UE. UE 500, as illustrated in FIG. 5, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE 500 includes processing circuitry 501 that is operatively coupled to input/output interface 505, radio frequency (RF) interface 509, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, and data 527. In other embodiments, storage medium 521 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc. In particular embodiment, the UE 500 may be one of the UE implemented in the terminal device described in FIG. 2. In particular embodiment, the UE 500 may be the UE described in FIGS. 3A-3B.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer. In certain embodiment, processing circuitry 501 may perform a method which is further illustrated in FIG. 13.

In the depicted embodiment, input/output interface 505 may be configured to provide a communication interface to an input device, output device, or input and output device. UE 500 may be configured to use an output device via input/output interface 505. An output device may use the same type of interface port as an input device. For example, a USB port may be used to provide input to and output from UE 500. The output device may be a speaker, a sound card, a video card, a display, a monitor, a printer, an actuator, an emitter, a smartcard, another output device, or any combination thereof. UE 500 may be configured to use an input device via input/output interface 505 to allow a user to capture information into UE 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 509 may be configured to provide a communication interface to RF components such as a transmitter, a receiver, and an antenna. Network connection interface 511 may be configured to provide a communication interface to network 543a. Network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. Network connection interface 511 may be configured to include a receiver and a transmitter interface used to communicate with one or more other devices over a communication network according to one or more communication protocols, such as Ethernet, TCP/IP, SONET, ATM, or the like. Network connection interface 511 may implement receiver and transmitter functionality appropriate to the communication network links (e.g., optical, electrical, and the like). The transmitter and receiver functions may share circuit components, software or firmware, or alternatively may be implemented separately.

RAM 517 may be configured to interface via bus 502 to processing circuitry 501 to provide storage or caching of data or computer instructions during the execution of software programs such as the operating system, application programs, and device drivers. ROM 519 may be configured to provide computer instructions or data to processing circuitry 501. For example, ROM 519 may be configured to store invariant low-level system code or data for basic system functions such as basic input and output (I/O), startup, or reception of keystrokes from a keyboard that are stored in a non-volatile memory. Storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 521 may be configured to include operating system 523, application program 525 such as a web browser application, a widget or gadget engine or another application, and data file 527. Storage medium 521 may store, for use by UE 500, any of a variety of various operating systems or combinations of operating systems.

Storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 521 may allow UE 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a device readable medium.

In FIG. 5, processing circuitry 501 may be configured to communicate with network 543*b* using communication subsystem 531. Network 543*a* and network 543*b* may be the same network or networks or different network or networks. Communication subsystem 531 may be configured to include one or more transceivers used to communicate with network 543*b*. For example, communication subsystem 531 may be configured to include one or more transceivers used to communicate with one or more remote transceivers of another device capable of wireless communication such as another WD, UE, or base station of a radio access network (RAN) according to one or more communication protocols, such as IEEE 802.5, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 531 may include cellular communication, Wi-Fi communication, Bluetooth communication, and GPS communication. Network 543*b* may encompass wired and/or wireless networks such as a local-area network (LAN), a wide-area network (WAN), a computer network, a wireless network, a telecommunications network, another like network or any combination thereof. For example, network 543*b* may be a cellular network, a Wi-Fi network, and/or a near-field network. Power source 513 may be configured to provide alternating current (AC) or direct current (DC) power to components of UE 500.

The features, benefits and/or functions described herein may be implemented in one of the components of UE 500 or partitioned across multiple components of UE 500. Further, the features, benefits, and/or functions described herein may be implemented in any combination of hardware, software or firmware. In one example, communication subsystem 531 may be configured to include any of the components described herein. Further, processing circuitry 501 may be configured to communicate with any of such components over bus 502. In another example, any of such components may be represented by program instructions stored in memory that when executed by processing circuitry 501 perform the corresponding functions described herein. In another example, the functionality of any of such components may be partitioned between processing circuitry 501 and communication subsystem 531. In another example, the non-computationally intensive functions of any of such components may be implemented in software or firmware and the computationally intensive functions may be implemented in hardware.

Figure 6:
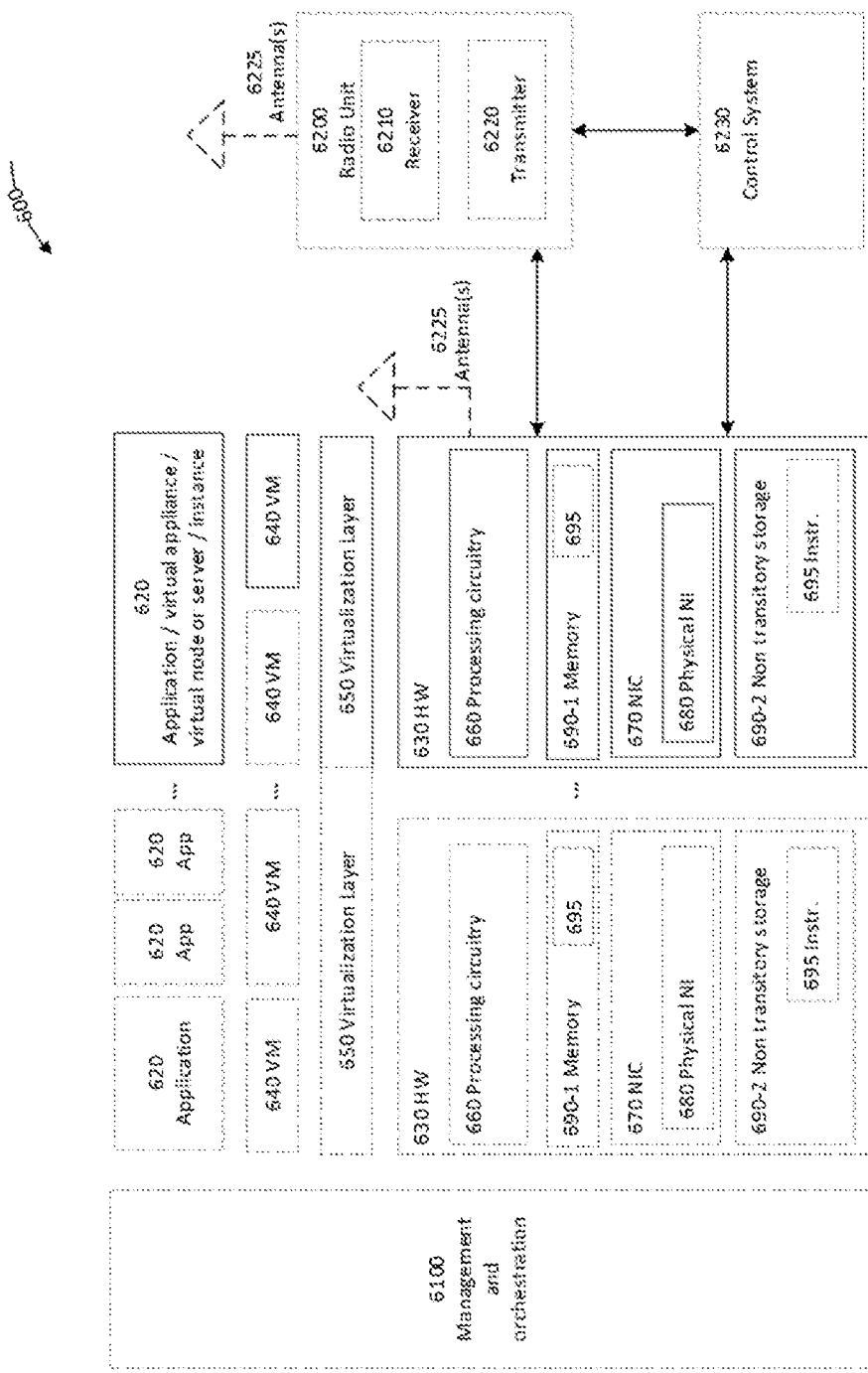
FIG. 6 illustrates an example virtualization environment, according to certain embodiments.

FIG. 6 illustrates an example virtualization environment, in accordance with certain embodiments. FIG. 6 is a schematic block diagram illustrating a virtualization environment 600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 600 hosted by one or more of hardware nodes 630. Further, in embodiments in which the virtual node is not a radio access node or does not require radio connectivity (e.g., a core network node), then the network node may be entirely virtualized.

The functions may be implemented by one or more applications 620 (which may alternatively be called software instances, virtual appliances, network functions, virtual nodes, virtual network functions, etc.) operative to implement some of the features, functions, and/or benefits of some of the embodiments disclosed herein. Applications 620 are run in virtualization environment 600 which provides hardware 630 comprising processing circuitry 660 and memory 690. Memory 690 contains instructions 695 executable by processing circuitry 660 whereby application 620 is operative to provide one or more of the features, benefits, and/or functions disclosed herein.

Virtualization environment 600, comprises general-purpose or special-purpose network hardware devices 630 comprising a set of one or more processors or processing circuitry 660, which may be commercial off-the-shelf (COTS) processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by processing circuitry 660. Each hardware device may comprise one or more network interface controllers (NICs) 670, also known as network interface cards, which include physical network interface 680. Each hardware device may also include non-transitory, persistent, machine-readable storage media 690-2 having stored therein software 695 and/or instructions executable by processing circuitry 660. Software 695 may include any type of software including software for instantiating one or more virtualization layers 650 (also referred to as hypervisors), software to execute virtual machines 640 as well as software allowing it to execute functions, features and/or benefits described in relation with some embodiments described herein.

Virtual machines 640, comprise virtual processing, virtual memory, virtual networking or interface and virtual storage, and may be run by a corresponding virtualization layer 650 or hypervisor. Different embodiments of the instance of virtual appliance 620 may be implemented on one or more of virtual machines 640, and the implementations may be made in different ways.

During operation, processing circuitry 660 executes software 695 to instantiate the hypervisor or virtualization layer 650, which may sometimes be referred to as a virtual machine monitor (VMM). Virtualization layer 650 may present a virtual operating platform that appears like networking hardware to virtual machine 640.

As shown in FIG. 6, hardware 630 may be a standalone network node with generic or specific components. Hardware 630 may comprise antenna 6225 and may implement some functions via virtualization. Alternatively, hardware 630 may be part of a larger cluster of hardware (e.g. such as in a data center or customer premise equipment (CPE)) where many hardware nodes work together and are managed via management and orchestration (MANO) 6100, which, among others, oversees lifecycle management of applications 620.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 640 may be a software implementation of a physical machine that runs programs as if they were executing on a physical, non-virtualized machine. Each of virtual machines 640, and that part of hardware 630 that executes that virtual machine, be it hardware dedicated to that virtual machine and/or hardware shared by that virtual machine with others of the virtual machines 640, forms a separate virtual network elements (VNE).

Still in the context of NFV, Virtual Network Function (VNF) is responsible for handling specific network functions that run in one or more virtual machines 640 on top of hardware networking infrastructure 630 and corresponds to application 620 in FIG. 6.

In some embodiments, one or more radio units 6200 that each include one or more transmitters 6220 and one or more receivers 6210 may be coupled to one or more antennas 6225. Radio units 6200 may communicate directly with hardware nodes 630 via one or more appropriate network interfaces and may be used in combination with the virtual components to provide a virtual node with radio capabilities, such as a radio access node or a base station.

In some embodiments, some signaling can be affected with the use of control system 6230 which may alternatively be used for communication between the hardware nodes 630 and radio units 6200.

Figure 7:
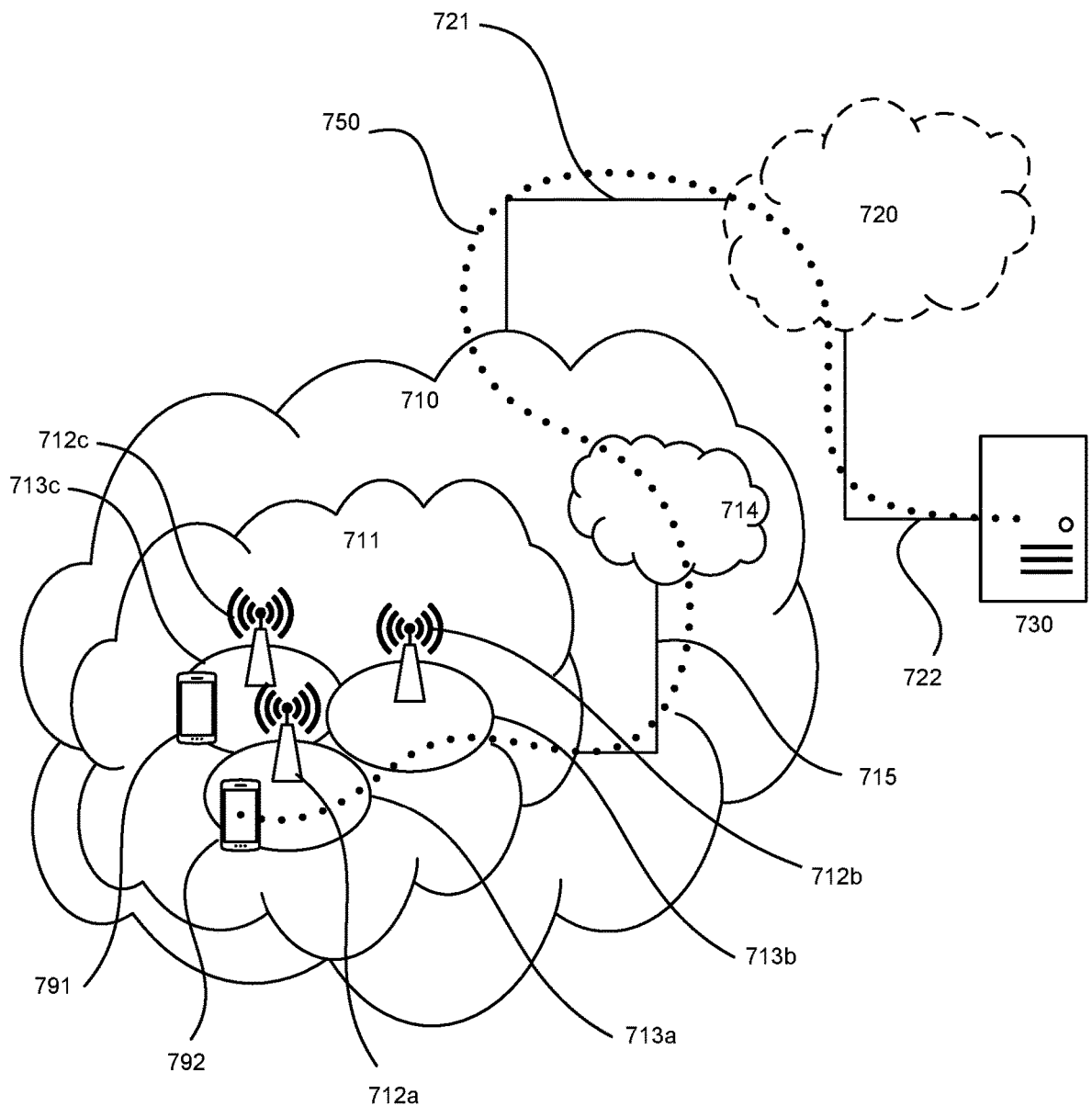
FIG. 7 illustrates an example telecommunication network connected via an intermediate network to a host computer, according to certain embodiments.

FIG. 7 illustrates an example telecommunication network connected via an intermediate network to a host computer, in accordance with certain embodiments. With reference to FIG. 7, in accordance with an embodiment, a communication system includes telecommunication network 710, such as a 3GPP-type cellular network, which comprises access network 711, such as a radio access network, and core network 714. Access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to core network 714 over a wired or wireless connection 715. A first UE 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

Telecommunication network 710 is itself connected to host computer 730, which may be embodied in the hardware and/or software of a standalone server, a cloud-implemented server, a distributed server or as processing resources in a server farm. Host computer 730 may be under the ownership or control of a service provider or may be operated by the service provider or on behalf of the service provider. Connections 721 and 722 between telecommunication network 710 and host computer 730 may extend directly from core network 714 to host computer 730 or may go via an optional intermediate network 720. Intermediate network 720 may be one of, or a combination of more than one of, a public, private or hosted network; intermediate network 720, if any, may be a backbone network or the Internet; in particular, intermediate network 720 may comprise two or more subnetworks (not shown).

The communication system of FIG. 7 as a whole enables connectivity between the connected UEs 791, 792 and host computer 730. The connectivity may be described as an over-the-top (OTT) connection 750. Host computer 730 and the connected UEs 791, 792 are configured to communicate data and/or signaling via OTT connection 750, using access network 711, core network 714, any intermediate network 720 and possible further infrastructure (not shown) as intermediaries. OTT connection 750 may be transparent in the sense that the participating communication devices through which OTT connection 750 passes are unaware of routing of uplink and downlink communications. For example, base station 712 may not or need not be informed about the past routing of an incoming downlink communication with data originating from host computer 730 to be forwarded (e.g., handed over) to a connected UE 791. Similarly, base station 712 need not be aware of the future routing of an outgoing uplink communication originating from the UE 791 towards the host computer 730.

Figure 8:
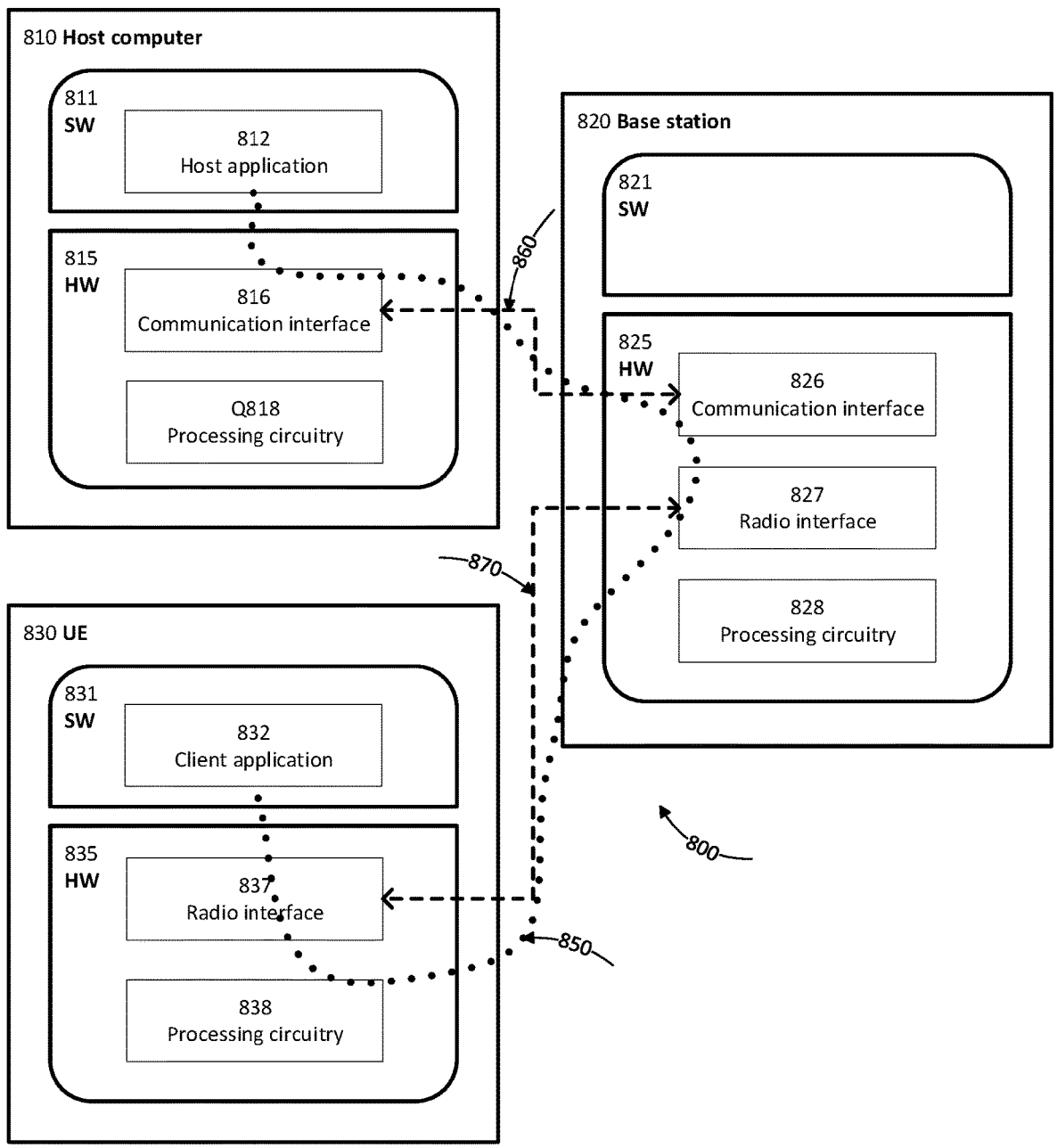
FIG. 8 illustrates an example host computer communicating via a base station with a user equipment over a partially wireless connection, according to certain embodiments.

FIG. 8 illustrates an example host computer communicating via a base station with a user equipment over a partially wireless connection, in accordance with certain embodiments. Example implementations, in accordance with an embodiment, of the UE, base station and host computer discussed in the preceding paragraphs will now be described with reference to FIG. 8. In communication system 800, host computer 810 comprises hardware 815 including communication interface 816 configured to set up and maintain a wired or wireless connection with an interface of a different communication device of communication system 800. Host computer 810 further comprises processing circuitry 818, which may have storage and/or processing capabilities. In particular, processing circuitry 818 may comprise one or more programmable processors, application-specific integrated circuits, field programmable gate arrays or combinations of these (not shown) adapted to execute instructions. Host computer 810 further comprises software 811, which is stored in or accessible by host computer 810 and executable by processing circuitry 818. Software 811 includes host application 812. Host application 812 may be operable to provide a service to a remote user, such as UE 830 connecting via OTT connection 850 terminating at UE 830 and host computer 810. In providing the service to the remote user, host application 812 may provide user data which is transmitted using OTT connection 850.

Communication system 800 further includes base station 820 provided in a telecommunication system and comprising hardware 825 enabling it to communicate with host computer 810 and with UE 830. Hardware 825 may include communication interface 826 for setting up and maintaining a wired or wireless connection with an interface of a different communication device of communication system 800, as well as radio interface 827 for setting up and maintaining at least wireless connection 870 with UE 830 located in a coverage area (not shown in FIG. 8) served by base station 820. Communication interface 826 may be configured to facilitate connection 860 to host computer 810. Connection 860 may be direct, or it may pass through a core network (not shown in FIG. 8) of the telecommunication system and/or through one or more intermediate networks outside the telecommunication system. In the embodiment shown, hardware 825 of base station 820 further includes processing circuitry 828, which may comprise one or more programmable processors, application-specific integrated circuits, field programmable gate arrays or combinations of these (not shown) adapted to execute instructions. Base station 820 further has software 821 stored internally or accessible via an external connection.

Communication system 800 further includes UE 830 already referred to. Its hardware 835 may include radio interface 837 configured to set up and maintain wireless connection 870 with a base station serving a coverage area in which UE 830 is currently located. Hardware 835 of UE 830 further includes processing circuitry 838, which may comprise one or more programmable processors, application-specific integrated circuits, field programmable gate arrays or combinations of these (not shown) adapted to execute instructions. UE 830 further comprises software 831, which is stored in or accessible by UE 830 and executable by processing circuitry 838. Software 831 includes client application 832. Client application 832 may be operable to provide a service to a human or non-human user via UE 830, with the support of host computer 810. In host computer 810, an executing host application 812 may communicate with the executing client application 832 via OTT connection 850 terminating at UE 830 and host computer 810. In providing the service to the user, client application 832 may receive request data from host application 812 and provide user data in response to the request data. OTT connection 850 may transfer both the request data and the user data. Client application 832 may interact with the user to generate the user data that it provides.

It is noted that host computer 810, base station 820 and UE 830 illustrated in FIG. 8 may be similar or identical to host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, OTT connection 850 has been drawn abstractly to illustrate the communication between host computer 810 and UE 830 via base station 820, without explicit reference to any intermediary devices and the precise routing of messages via these devices. Network infrastructure may determine the routing, which it may be configured to hide from UE 830 or from the service provider operating host computer 810, or both. While OTT connection 850 is active, the network infrastructure may further take decisions by which it dynamically changes the routing (e.g., on the basis of load balancing consideration or reconfiguration of the network).

Wireless connection 870 between UE 830 and base station 820 is in accordance with the teachings of the embodiments described throughout this disclosure. One or more of the various embodiments improve the performance of OTT services provided to UE 830 using OTT connection 850, in which wireless connection 870 forms the last segment. More precisely, the teachings of these embodiments may improve the handling of redundant data in the transmit buffer and thereby provide benefits such as improved efficiency in radio resource use (e.g., not transmitting redundant data) as well as reduced delay in receiving new data (e.g., by removing redundant data in the buffer, new data can be transmitted sooner).

A measurement procedure may be provided for the purpose of monitoring data rate, latency and other factors on which the one or more embodiments improve. There may further be an optional network functionality for reconfiguring OTT connection 850 between host computer 810 and UE 830, in response to variations in the measurement results. The measurement procedure and/or the network functionality for reconfiguring OTT connection 850 may be implemented in software 811 and hardware 815 of host computer 810 or in software 831 and hardware 835 of UE 830, or both. In embodiments, sensors (not shown) may be deployed in or in association with communication devices through which OTT connection 850 passes; the sensors may participate in the measurement procedure by supplying values of the monitored quantities exemplified above or supplying values of other physical quantities from which software 811, 831 may compute or estimate the monitored quantities. The reconfiguring of OTT connection 850 may include message format, retransmission settings, preferred routing etc.; the reconfiguring need not affect base station 820, and it may be unknown or imperceptible to base station 820. Such procedures and functionalities may be known and practiced in the art. In certain embodiments, measurements may involve proprietary UE signaling facilitating host computer 810's measurements of throughput, propagation times, latency and the like. The measurements may be implemented in that software 811 and 831 causes messages to be transmitted, in particular empty or 'dummy' messages, using OTT connection 850 while it monitors propagation times, errors etc.

Figure 9:
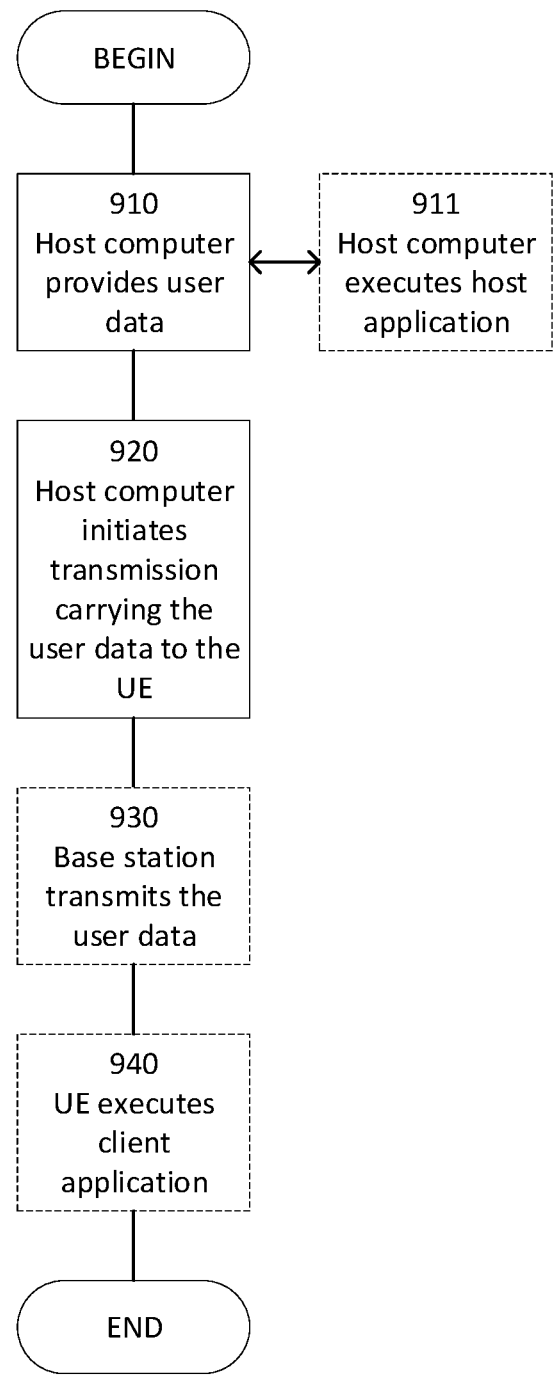
FIG. 9 illustrates an example method implemented in a communication system including a host computer, a base station and a user equipment, according to certain embodiments.

FIG. 9 illustrates an example method implemented in a communication system including a host computer, a base station and a user equipment, in accordance with certain embodiments. More specifically, FIG. 9 is a flowchart illustrating a method implemented in a communication system, in accordance with one embodiment. The communication system includes a host computer, a base station which may be a network node described with reference to FIG. 14. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
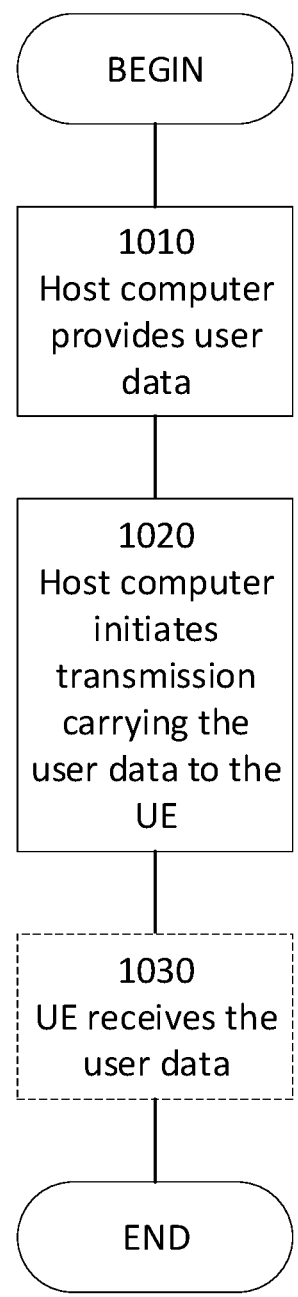
FIG. 10 illustrates another example method implemented in a communication system including a host computer, a base station and a user equipment, according to certain embodiments.

FIG. 10 illustrates an example method implemented in a communication system including a host computer, a base station and a user equipment, in accordance with some embodiments. More specifically, FIG. 10 is a flowchart illustrating a method implemented in a communication system, in accordance with one embodiment. The communication system includes a host computer, a base station which may be a network node described with reference to FIG. 14. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
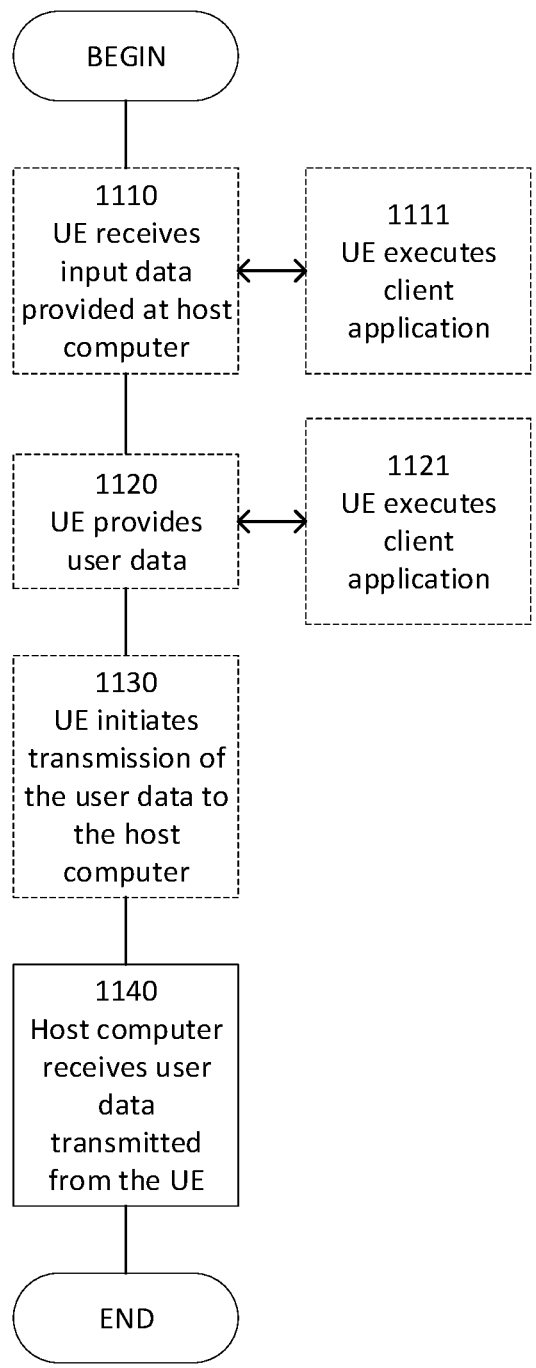
FIG. 11 illustrates another further example method implemented in a communication system including a host computer, a base station and a user equipment, according to certain embodiments.

FIG. 11 illustrates another further example method implemented in a communication system including a host computer, a base station and a user equipment, in accordance with certain embodiments. More specifically, FIG. 11 is a flowchart illustrating a method implemented in a communication system, in accordance with one embodiment. The communication system includes a host computer, a base station which may be a network node described with reference to FIG. 14. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
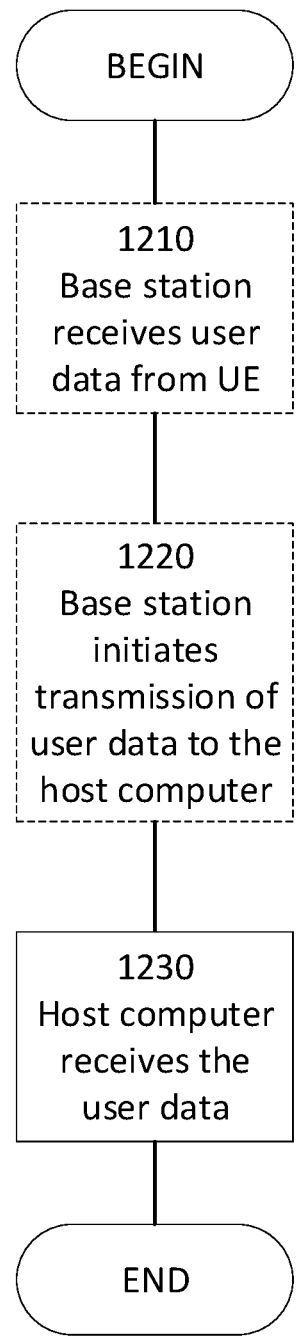
FIG. 12 illustrates another yet example method implemented in a communication system including a host computer, a base station and a user equipment, according to certain embodiments.

FIG. 12 illustrates another example method implemented in a communication system including a host computer, a base station and a user equipment, in accordance with certain embodiments. More specifically, FIG. 12 is a flowchart illustrating a method implemented in a communication system, in accordance with one embodiment. The communication system includes a host computer, a base station and a UE. In one embodiment, the base station may be a network node described with references to FIG. 14. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

Figure 13:
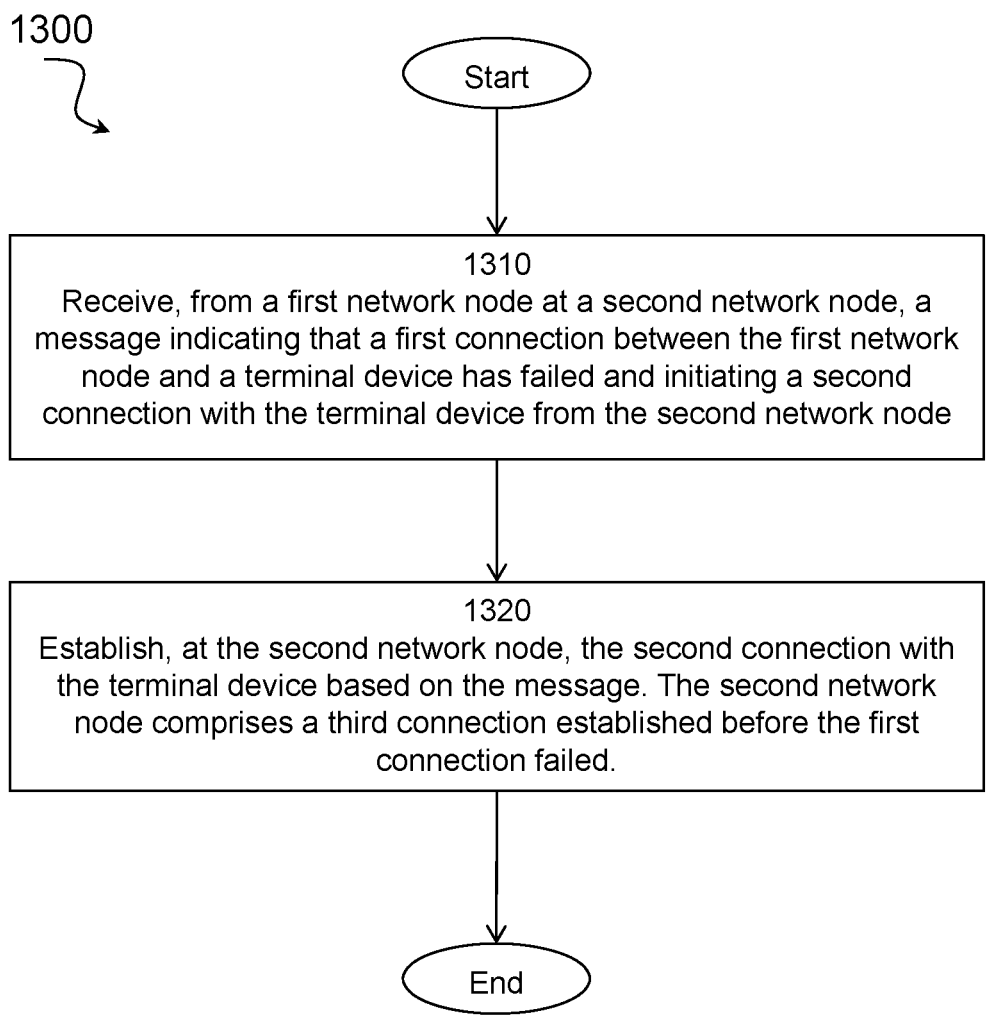
FIG. 13 illustrates a flow diagram of an example method performed at a network node, in accordance with certain embodiments.

FIG. 13 illustrates a flow diagram of an example method, in accordance with certain embodiments. The method may be performed by a network node. The network node may be the network node 460 depicted in FIG. 4. Method 1300 begins at step 1310 with receiving, from a first network node at a second network node, a message indicating that a first connection between the first network node and a terminal device has failed. In particular embodiments, the message comprises an indication to initiate a second connection with the terminal device from the second network node.

At step 1320, the method 1300 establishes, at the second network node, the second connection with the terminal device based on the message. In particular embodiments, the second network node comprises a third connection established before the first connection failed. In particular embodiments, the first connection carries data transmitted in the third connection before the first connection failed. In particular embodiments, the second connection carries data transmitted in the third connection after the first connection failed. In particular embodiments, at least two of the first connection, the second connection, and the third connection may be provided via dual connectivity (DC). For example, before the first connection failed, the first connection and the third connection are provided via DC. In another embodiment, when the first connection failed, the second connection and the third connection may not be provided via DC. In particular embodiments, the terminal device is configured to a carrier aggregation (CA) configuration through a master cell group (MCG) when the failure of the first connection is a secondary cell group (SCG) failure.

In particular embodiments, the first network node may be a secondary node, and the second network node may be a master node. In this embodiment, the second network node may perform CA for packet data convergence protocol (PDCP) duplication. In another embodiment, the second connection is between the second network node and a third network node.

In particular embodiments, the first network node may be a master node, and the second network node may be a secondary node. In this embodiment, the message further indicates the second network node to take over radio resource control (RRC).

In particular embodiments, the terminal device comprises a first UE and a second UE. In this embodiment, the first connection is between the first UE of the terminal device and the first network node, and the second connection and the third connection are between the second UE of the terminal device and the second network node.

Figure 14:
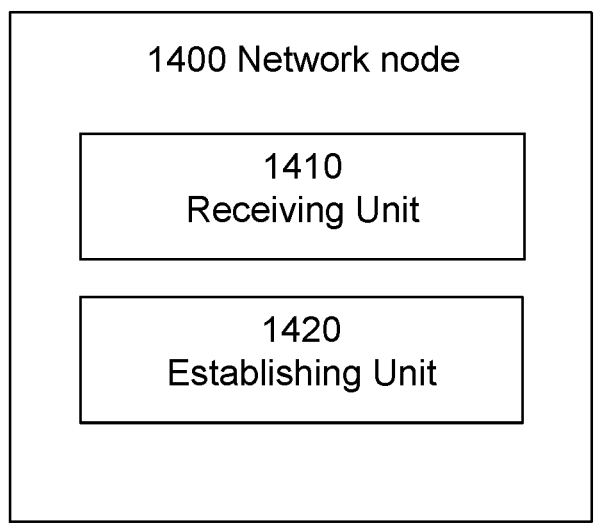
FIG. 14 illustrates a block schematic of an example network node, in accordance with certain embodiments.

FIG. 14 is a schematic block diagram of an exemplary network node 1400 in a wireless network, in accordance with certain embodiments. In some embodiments, the wireless network may be the wireless network 406 shown in FIG. 4. The network node may be the network node 460 shown in FIG. 4. The network node 1400 is operable to carry out the example method described with reference to FIG. 13 and possibly any other processes or methods disclosed herein. It is also to be understood that the methods in FIG. 13 is not necessarily carried out solely by the network node 1400. At least some operations of the method can be performed by one or more other entities.

Network node 1400 may comprise processing circuitry, which may include one or more microprocessor or microcontrollers, as well as other digital hardware, which may include digital signal processors (DSPs), special-purpose digital logic, and the like. In some embodiments, the processing circuitry of the network node 1400 may be the processing circuitry 470 shown in FIG. 4. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1410, establishing unit 1420, and any other suitable units of network node 1400 to perform corresponding functions according one or more embodiments of the present disclosure, such as a processor, a receiver, and a transmitter.

As illustrated in FIG. 14, the network node 1400 includes the receiving unit 1410, and the establishing unit 1420. The receiving unit 1410 may be configured to receive, from a first network node, a message indicating that a first connection between the first network node and a terminal device has failed. In particular embodiments, the message comprises an indication to initiate a second connection with the terminal device.

The establishing unit 1420 may be configured to establish the second connection with the terminal device based on the message. In particular embodiments, the establishing unit 1420 establishes a third connection before the first connection failed. In particular embodiments, the first connection carries data transmitted in the third connection before the first connection failed. In particular embodiments, the second connection carries data transmitted in the third connection after the first connection failed. In particular embodiments, at least two of the first connection, the second connection, and the third connection may be provided via dual connectivity (DC). For example, before the first connection failed, the first connection and the third connection are provided via DC. In another embodiment, when the first connection failed, the second connection and the third connection may not be provided via DC. In particular embodiments, the terminal device is configured to a carrier aggregation (CA) configuration through a master cell group (MCG) when the failure of the first connection is a secondary cell group (SCG) failure.

In particular embodiments, the first network node may be a secondary node, and the network node 1400 may be a master node. In this embodiment, the network node 1400 may perform CA for packet data convergence protocol (PDCP) duplication. In another embodiment, the network node 1400 may further establish a fourth connection with a second network node.

In particular embodiments, the first network node may be a master node, and the network node 1400 may be a secondary node. In this embodiment, the message further indicates the network node 1400 to take over radio resource control (RRC).

In particular embodiments, the terminal device comprises a first UE and a second UE. In this embodiment, the first connection is between the first UE of the terminal device and the first network node, and the second connection and the third connection are between the second UE of the terminal device and the network node 1400.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

According to various embodiments, an advantage of features herein is securing a data transmission by having a backup connection with a terminal device. In addition, having a duplicated connection prevents a data loss in an unexpected system failure, such that the reliability of data transmission can be ensured, and further, the network performance can be improved.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for transmission reliability, comprising:
receiving, from a first network node at a second network node, a message indicating that a first connection between the first network node and a terminal device has failed, wherein the message comprises an indication to initiate a second connection with the terminal device from the second network node; and
establishing, at the second network node, the second connection with the terminal device based on the message, wherein:
the second network node comprises a third connection to the terminal device established before the first connection failed;
the first connection carries data transmitted in the third connection before the first connection failed; and
the second connection carries data transmitted in the third connection after the first connection failed.

2. The method according to claim 1, wherein at least two of the first connection, the second connection, and the third connection are provided via dual connectivity (DC).

3. The method according to claim 2, wherein the first network node is a secondary node, and the second network node is a master node.

4. The method according to claim 3, wherein the second network node performs carrier aggregation (CA) for packet data convergence protocol (PDCP) duplication.

5. The method according to claim 3, further comprising establishing a fourth connection between the second network node and a third network node.

6. The method according to claim 2, wherein the first network node is a master node, and the second network node is a secondary node.

7. The method according to claim 6, wherein the message further indicates the second network node to take over radio resource control (RRC).

8. The method according to claim 2, wherein the terminal device is configured to a CA configuration through a master cell group (MCG) when the failure of the first connection is a secondary cell group (SCG) failure.

9. The method according to claim 1, wherein the terminal device comprises a first user equipment (UE) and a second UE.

10. The method according to claim 9, wherein the first connection is between the first UE of the terminal device and the first network node, and the second connection and the third connection are between the second UE of the terminal device and the second network node.

11. A network node for transmission reliability, comprising:
at least one processing circuitry; and
at least one storage that stores processor-executable instructions, when executed by the processing circuitry, causes a network node to:
receive, from a first network node, a message indicating that a first connection between the first network node and a terminal device has failed, wherein the message comprises an indication to initiate a second connection with the terminal device; and
establish the second connection with the terminal device based on the message, wherein:
the network node comprises a third connection to the terminal device established before the first connection failed;
the first connection carries data transmitted in the third connection before the first connection failed; and
the second connection carries data transmitted in the third connection after the first connection failed.

12. The network node according to claim 11, wherein at least two of the first connection, the second connection, and the third connection are provided via dual connectivity (DC).

13. The network node according to claim 12, wherein the first network node is a secondary node, and the network node is a master node.

14. The network node according to claim 13, wherein the instructions further cause the network node to perform carrier aggregation (CA) for packet data convergence protocol (PDCP) duplication.

15. The network node according to claim 13, wherein the instructions further cause the network node to establish a fourth connection with a second network node.

16. The network node according to claim 12, wherein the first network node is a master node, and the network node is a secondary node.

17. The network node according to claim 16, wherein the message further indicates the network node to take over radio resource control (RRC).

18. The network node according to claim 12, wherein the terminal device is configured to a CA configuration through a master cell group (MCG) when the failure of the first connection is a secondary cell group (SCG) failure.

19. The network node according to claim 11, wherein the terminal device comprises a first user equipment (UE) and a second UE.

20. The network node according to claim 19, wherein the first connection is between the first UE of the terminal device and the first network node, and the second connection and the third connection are between the second UE of the terminal device and the network node.

* * * * *